(12) United States Patent
Martin et al.

(10) Patent No.: US 8,614,809 B2
(45) Date of Patent: Dec. 24, 2013

(54) SYSTEM AND METHOD FOR PROVIDING CONTEXTUAL EXCEPTION PAGE PROGRAMMING WITHIN A PRINT JOB

(75) Inventors: Andrew Martin, Honeoye Falls, NY (US); Shane Jewitt, Rochester, NY (US); Ken Hayward, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 1143 days.

(21) Appl. No.: 11/702,771

(22) Filed: Feb. 6, 2007

(65) Prior Publication Data

US 2008/0186542 A1 Aug. 7, 2008

(51) Int. Cl.
G06F 3/12 (2006.01)

(52) U.S. Cl.
USPC .......................................... 358/1.15; 358/1.1

(58) Field of Classification Search
USPC .................................. 358/1.15, 1.1
See application file for complete search history.

(56) References Cited

U.S. PATENT DOCUMENTS

| | | | | |
|---|---|---|---|---|
| 5,133,048 A | * | 7/1992 | Parsons et al. | 358/1.12 |
| 5,398,289 A | * | 3/1995 | Rourke et al. | 382/100 |
| 5,614,993 A | * | 3/1997 | Smith et al. | 399/81 |
| 6,198,480 B1 | * | 3/2001 | Cotugno et al. | 715/866 |
| 6,621,590 B1 | * | 9/2003 | Livingston | 358/1.15 |
| 6,628,311 B1 | * | 9/2003 | Fang | 715/777 |
| 2003/0043212 A1 | * | 3/2003 | Kremer | 345/838 |
| 2004/0046797 A1 | * | 3/2004 | Perry | 345/771 |
| 2004/0060010 A1 | * | 3/2004 | Bright et al. | 715/526 |
| 2004/0194033 A1 | * | 9/2004 | Holzwarth et al. | 715/530 |
| 2005/0041993 A1 | * | 2/2005 | Barry et al. | 399/127 |
| 2005/0157330 A1 | * | 7/2005 | Giuliano | 358/1.15 |

OTHER PUBLICATIONS

Extended European Search Report for EP 08 15 1115 dated Dec. 22, 2010.

* cited by examiner

*Primary Examiner* — Qian Yang
*Assistant Examiner* — Martin Mushambo
(74) *Attorney, Agent, or Firm* — Luis M. Ortiz; Kermit D. Lopez; Ortiz & Lopez, PLLC (57) ABSTRACT

A system having an operative set of processor executable instructions employed in connection with an exception page programming tool for programming exceptions to a print job. The system comprises a visual representation module and a graphical user interface module. The visual representation module may be configured to operatively generate at least one visual representation of at least one of a page in a page description language file, and a programmed exception related to the page description language file. The graphical user interface module may further be configured to operatively generate and operatively display a graphical user interface. The graphical user interface module may be configured to operatively display the at least one visual representation of the programmed exception related to the page description language file within context of the print job.

12 Claims, 8 Drawing Sheets

SYSTEM AND METHOD FOR PROVIDING CONTEXTUAL EXCEPTION PAGE PROGRAMMING WITHIN A PRINT JOB

BACKGROUND

1. Technical Field

The present disclosure relates to exception page programming, and, in particular, to a system and method for providing an exception page programming tool for use with a page description language file where the exception page programming tool can display exception programming within context of a print job.

2. Description of Related Art

Page description languages ("PDLs") are computer languages and/or file formats that can be translated into printed documents. Many printing systems can accept the PDL data directly without pre-processing by another device such as a computer. PDL files are generally designed for describing how characters, graphics, and/or images should be printed on a substrate by a printing device. PDL files generally store printing data in a more abstract manner than a pixel-wise image file. For example: rather than describing a square pixel-by-pixel, a PDL file may describe the square in terms of position, size, color etc. These types of PDL files may have several advantages over bitmap files, such as file size and platform robustness. Additionally, some printing systems may receive a PDL file directly with minimal or no processing before the file is received by the printing system.

When setting up one or more PDL files for printing, specialized printing tools sometimes assist a user in controlling the settings, printing flow, and/or other parameters for setting up a printing job for a printer system. For example: it is common to apply exception level programming to a PDL file before printing commences. Generally, "exceptions" in this context, are items not included in the original page content of the PDL file or contain different item level programming from the body of the job. These are considered to be "Exceptions" to the job-level programming that defines the body of the job. Exceptions may be applied to one or more pages, and exceptions generally do not modify the PDL file itself, but rather provide an effective way to make last minute changes and/or specialized settings. Tools that apply exception level programming are called exception page programming tools.

Typically, exceptions can be set for paper stocks (covers, stock exceptions, page inserts), page sequencing (chapter starts), image quality and image shifting. Other exceptions may include subset finishing, imposition, and page level annotation. For example, a PDL file may include image quality information, such as contrast settings, color settings and other settings associated with certain aspects of the PDL file. An exception may be applied to a particular page or a subset of pages that override these PDL properties.

Though, not all exceptions override PDL parameters; for example: pages may be inserted in between pages, such as tabbed pages to delineate sections and/or chapters. These inserts are also sometimes treated as exceptions. Additionally, exception level programming may apply to the current stock (sometimes referred to as the paper stock). The stock is the type of medium or material that is to be printed on. Many modern printing systems have multiple sources of stock, separated by color, quality, weight, medium, material, finishing and/or coating material. For example, a PDL file may have 30 pages of text and one photographic quality page; an exception may be associated with that photographic quality page to utilize a medium more suitable for printing a photographic level of detail and/or quality.

In addition, some exception level programming may include "subset finishing" features, where a subset of pages, sheets, or aspects are modified. For example, a subset of pages may have certain attributes that are modified in the printing process, such as the use of high quality paper for a certain chapter of a PDL file. Also, an exception (or subset finishing) may be applied for stapling a range of pages within a print job. These changes are also considered exception level programming.

There are at least two general types of objects that exceptions select and manage: pages and sheets. Pages are usually discrete pieces of print-related data contained within the PDL file that are to be printed. Exceptions that may be applied to pages include chapter starts, image quality adjustment and image shifting. Sheets usually are pieces of paper. Each sheet has two sides, a front and back, that can be printed on. A page can be mapped to a side of a sheet. It is common practice to map pages to one or both sides of a sheet, e.g., page 1 is printed on side 1 of sheet 1, while page 2 is printed on side 2 of sheet 1, or alternatively, page 1 is printed on side 1 of sheet 1, while page 2 is printed on side 1 of sheet 2. Thus, in certain contexts, the two words may be used interchangeably.

Also, there are two general classifications of print job programming: job-level programming and page-level programming. The job level programming tools usually modify features for the entire job. Page-level programming is usually done by modifying and/or creating exceptions by utilizing an exception programming tool; although it is possible to utilize exceptions to modify multiple pages and/or sheets.

Exception programming varies according to many aspects, including but not limited to: the specific PDL language used, the printing system used, time constraints, expense constraints and stock availability. Also, exception page programming may be conducted by a user from several locations. A user may control the programming from a computer that is directly attached to the printing system, from a computer that may access the printer through a network, from a computer that is part of the printing system, from a digital front end and/or from a user interface attached directly to the printing system itself.

Usually, a graphical user interface (abbreviated herein as "GUI") is utilized to assist in exception page programming. Additionally, any software that creates, edits, or converts PDL files may also contain integrated modules and/or software to provide exception level programming. Currently, exception programming is generally viewed in terms of "exception only" views, i.e. views that only include the pages that have exceptions applied to them. There has been a need to provide a more effective way to view exceptions while performing exception page programming.

As with most graphical user interfaces, however, there is sometimes a trade-off between processing speed and ease-of-use. Consider the following: within other software tools and in some operating systems, it is possible to view images as icons or thumbnails. Icon viewing is where a small picture, image or graphic is used to show a generic display for an item type, e.g., an operating system may show the same image for all word-processing files of a certain file format.

Thumbnails, on the other hand, may provide a preview or a "sneak-peak" of some or all of the content found in the underlying file. For example, some operating systems, when viewing files within a certain directory (or folder) display a small picture of what the file actually looks like when opened. For example, if a user has a jpeg file of a picture taken of a fish during a fishing expedition, the file may show a smaller image of that picture (and thus a small "thumbnail" of the fish in question).

Thumbnails are not necessarily limited to image and picture files. Certain types of files may be "rendered" and/or interpreted. For example, consider a word-processing file: a thumbnail image may be an image of the file (or a particular page) when opened by the word processor, or alternatively, it may be a rendering of a file (or a particular page) as may appear when the file is printed. Generally a thumbnail image of the file when printed is called a WYSIWYG thumbnail (What You See Is What You Get).

The drawback of such thumbnails is the overhead that may be incurred when showing a thumbnail representation of a file. For example, if the file has lots of data associated with describing a file in terms of elements and properties (e.g. "square", "size=x,y", "color=blue", "position=2 inches, 4 inches") then before a thumbnail representation can be shown, the file must be interpreted by a program so the image may be rendered. Interpreting and/or rendering may have significant overhead because of the memory and processing resources that may be required to interpret and/or render a thumbnail image. There has been a need for improved utilization of resources when displaying thumbnails.

SUMMARY

The present disclosure relates to exception page programming, and, in particular, to a system and method for providing an exception page programming tool for use with a page description language file where the exception page programming tool can display exception programming within context of a print job.

In one aspect thereof, the present disclosure relates to a system having an operative set of processor executable instructions employed in connection with an exception page programming tool for programming exceptions to a print job. The exception page programming tool may be configured to program a xerographic machine and/or an electrostatographic machine. Additionally or alternatively, the system may be an installable module installable in a xerographic machine and/or an electrostatographic machine.

The system may include a visual representation module and a graphical user interface module. The visual representation module may be configured to operatively generate at least one visual representation of at least one of a page in a page description language file, and a programmed exception related to the page description language file. At least one of the visual representations visually depicts an exception within context of a print job. Also, the GUI module may be configured to operatively generate and operatively display a graphical user interface. The graphical user interface module may be configured to operatively display the at least one visual representation of the programmed exception related to the page description language file within context of the print job.

The GUI module may further include a view-selection component. The view-selection component may be user selectable, and a user may have the choices of a list-view selection, an icon-view selection, a thumbnail-view selection and a selectable-proof-view selection of the view-selection component.

In another aspect thereof of the present disclosure, the graphical user interface module may be configured to operatively display a list-view. The graphical user interface module may be further configured to operatively display a plurality of rows including a first row and a plurality of columns where at least one visual representation may be operatively displayed within the first row. The at least one visual representation may include a current stock component and an overlay component. The current stock component may be configured to operatively display a visual representation of a property of the current stock component; and the property of the current stock component may be stock type, stock color, stock size and/or stock orientation. The overlay component may be user-selectable; and a user may be able to select icon-image selection and/or thumbnail-image selection of the overlay component.

The thumbnail-image selection of the overlay component may cause the overlay component to operatively display a WYSIWYG image, a partially rendered image, a blank page image and/or a blank sheet image. Also, the icon-image selection may cause the overlay component to display a generic icon, a gif, a jpeg, a user-configurable image, a file type icon, an operating system file-type icon, blank sheet image and/or a blank page image.

In yet another aspect thereof of the present disclosure, the graphical user interface module may be configured to operatively display the at least one visual representation as a proof. The graphical user interface module may be configured to operatively display a thumbnail-view and/or an icon-view.

In another aspect thereof of the present disclosure, the GUI module may be configure to operatively display the at least one visual representation as a selectable-proof. The at least one visual representation may include a current stock component and an overlay component. The overlay component may be user selectable; and the user may select an icon-image selection and/or a thumbnail-image selection of the overlay component. The thumbnail-image selection may cause the overlay component to operatively display a WYSIWYG image, a partially rendered image, a blank page image and a blank sheet image. Also, the icon-image selection may be configured to cause the overlay component to operatively display a generic icon, a gif a jpeg, a user-configurable image, a file type icon, an operating system file-type icon, a blank sheet image and/or a blank page image.

In yet another aspect thereof, the present disclosure relates to a method implemented by an operative set of processor executable instructions executed by at least one processor that provides exception page programming in connection with an exception page programming tool. The method may include operatively generating at least one visual representation and providing a graphical user interface (GUI) module. The step of operatively generating at least one visual representation operatively generates at least one visual representation of a page in a PDL file, and/or a programmed exception related to a PDL file. The step of providing a GUI interface module may provide a GUI module that operatively generates and operatively displays a graphical user interface. The graphical user interface module may be configured to operatively display the at least one visual representation of the programmed exception related to the page description language file within context of a print job. The step of operatively displaying the at least one visual representation and/or operatively displaying a GUI interface may be implemented by a system call to an operating system.

In another aspect thereof of the present disclosure, the method may include a graphical user interface module that may be configured to operatively display a list-view. Furthermore, the graphical user interface module may operatively display a plurality of rows including a first row and a plurality of columns; and the graphical user interface module may be configured to operatively display the at least one visual representation within the first row. The method may further including having the at least one visual representation further including a current stock component and an overlay component. The methodology may include the step of selecting the overlay component to be an icon-image selection and a thumbnail-image selection of the overlay component.

In another aspect thereof of the present disclosure, a methodology where the GUI module is configured to operatively display the at least one visual representation as a proof is consistent with the present disclosure; and the graphical user interface module may be configured to operatively display a thumbnail-view and/or an icon-view.

In another aspect thereof of the present disclosure, the graphical user interface module may be configured to operatively display the at least one visual representation as a selectable-proof. The at least one visual representation may include a current stock component and/or an overlay component. The method may further include selecting the overlay component to be an icon-image selection and/or a thumbnail-image selection of the overlay component.

In yet a another aspect thereof of the present disclosure, a computer-readable medium is provided storing a set of programmable instructions configured for being executed by at least one processor for performing a method is provided. The method may include the steps of: (1) operatively generating at least one visual representation of at least one of a page in a page description language file, and a programmed exception related to the page description language file, and (2) providing a graphical user interface module configured to operatively generate and operatively display the at least one visual representation of the programmed exception related to the page description language file within context of a print job.

BRIEF DESCRIPTION OF THE DRAWINGS

These and other advantages will become more apparent from the following detailed description of the various embodiments of the present disclosure with reference to the drawings wherein:

FIG. 7 is a depiction of a GUI that displays a list-view of exception pages within context of a print job, the exception pages are displayed as icons in accordance with the present disclosure.

DETAILED DESCRIPTION

Figure 1:
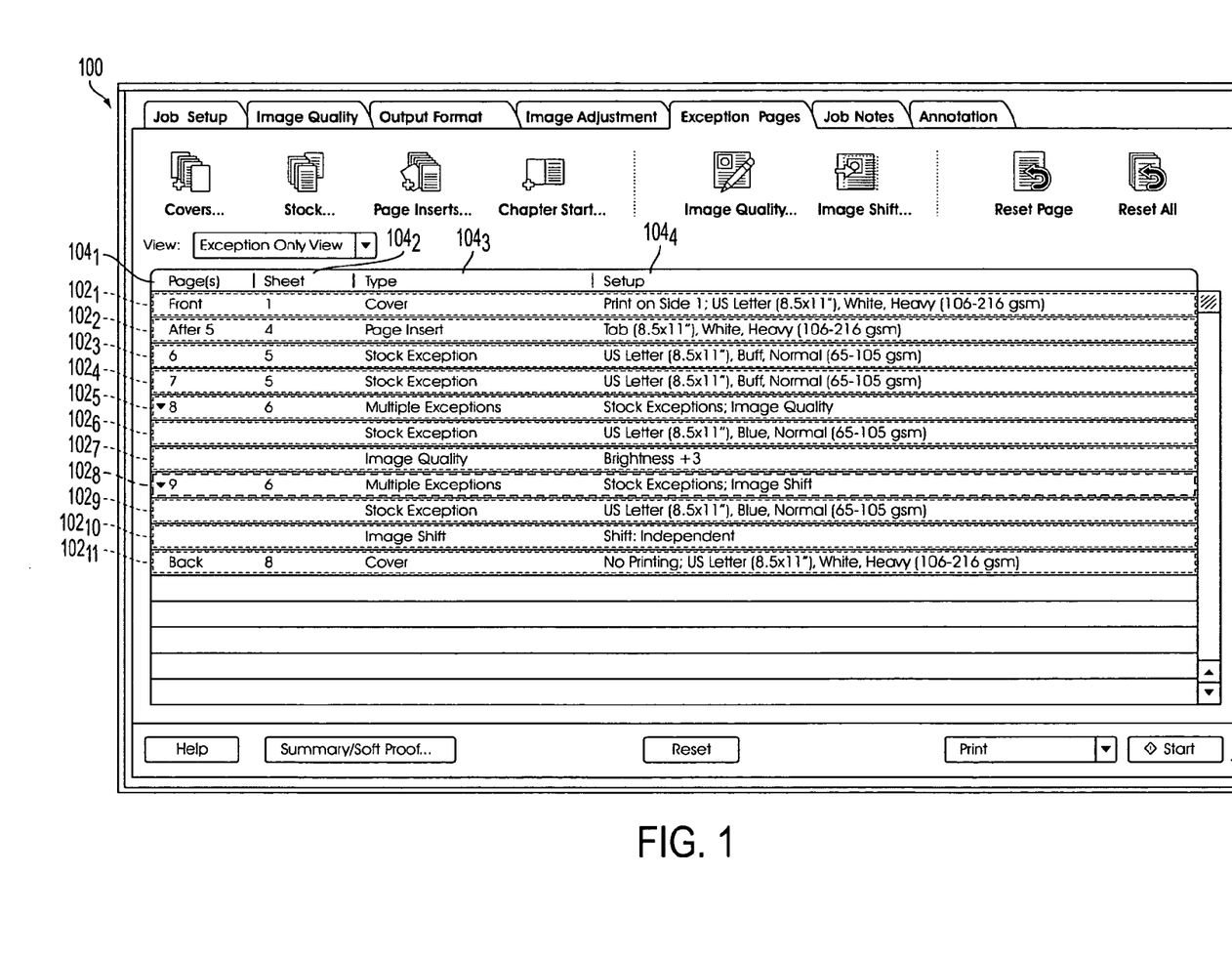
FIG. 1 is a depiction of a GUI that is used in connection with an implementation of an exception page programming tool that displays a prior art exception-only view.

Referring now to the drawings, FIG. 1 is a depiction of a Graphical User Interface (GUI) 100 that is part of an exception page programming tool that uses a prior art exception-only view without any visual representations of pages, sheets or exceptions. The exception page programming tool only utilizes an "exceptions-only" view of a PDL file and has no visual representations. Additionally, FIG. 1 shows an exception-only view with the exceptions being displayed in a "list-view" format. GUI 100 has a plurality of rows 102 that includes rows $102_1$ through $102_{11}$. Also, GUI 100 shows a plurality of columns 104. The plurality of columns 104 includes columns $104_1$ through $104_4$. The plurality of rows 102 and the plurality of columns 104 form the "list-view". GUI 100 only displays the pages that have had exception programming applied to them.

As is depicted in FIG. 1, only the pages that have exceptions applied to them are represented. For example, row $102_1$ shows an exception that was applied before page 1 of a PDL file. The next exception is shown in row $102_2$. Row $102_2$ shows a "page insert" exception that occurs after page 5 in a PDL file. Pages 1 through 4 of the PDL file are not depicted and/or indicated and thus GUI 100 does not show exceptions within context of a print job. Additionally, note that GUI 100 has no visual representations of the pages, sheets or exceptions related to the corresponding PDL file, e.g. icons or thumbnails.

Figure 2:
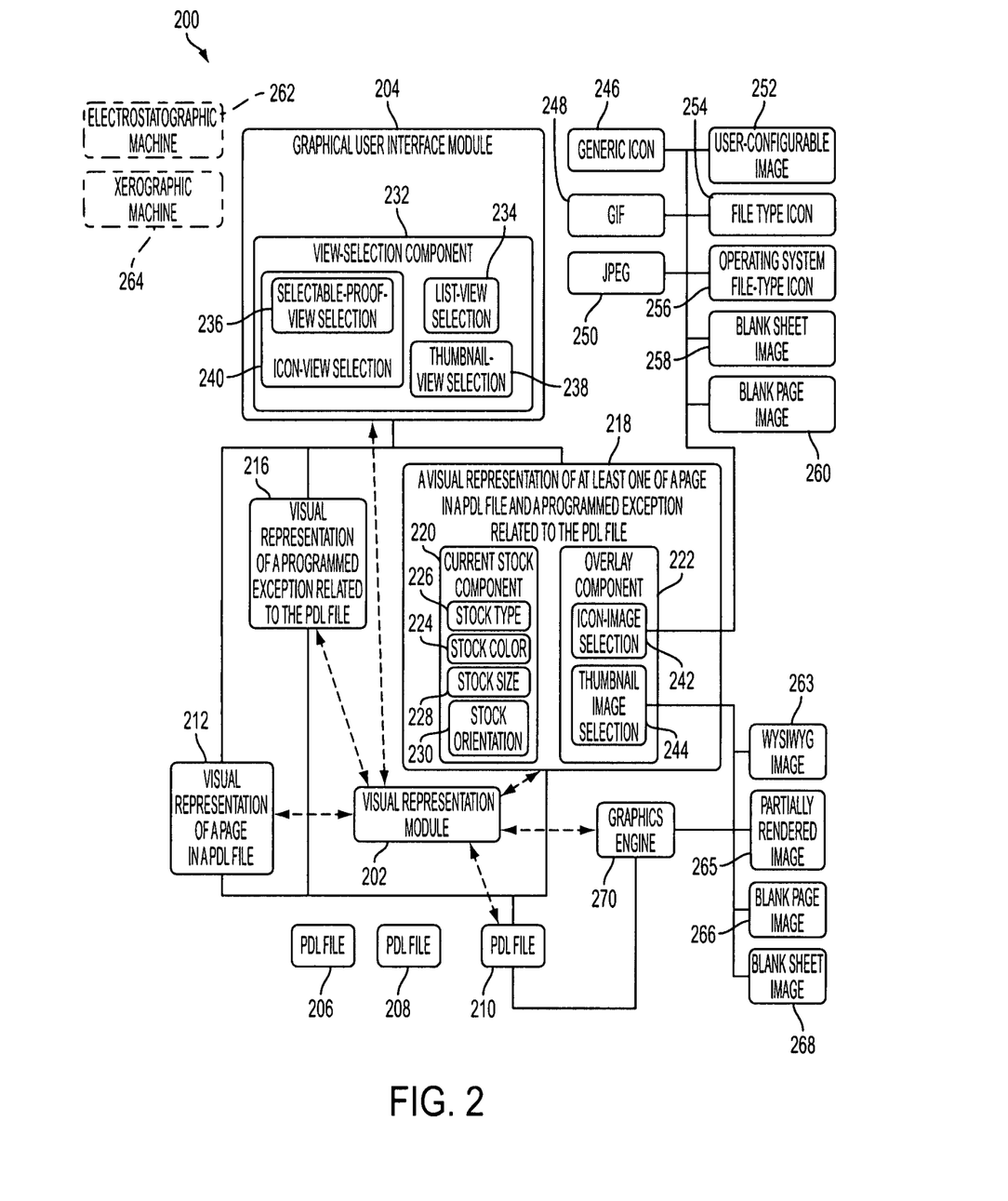
FIG. 2 illustrates a block diagram of a system employed in connection with an exception page programming tool that includes a GUI module that can operatively generate and operatively display a GUI, the system can operatively display exception pages in context of a print job in accordance with the present disclosure.

Referring now to the drawings, FIG. 2 is a block diagram of a system 200 that can be used in connection with an exception page programming tool. System 200 can be used for viewing exceptions within context of a print job. System 200 can be used to provide functionality to and/or program electrostatographic machine 262 and/or xerographic machine 264. Additionally or alternatively, system 200 may be a module installable in electrostatographic machine 262 and/or xerographic machine 262, or may be machine independent; also system 200 may provide services to a user near machines 262 and/or 264, and on machine 262 and/or 242. Additionally or alternatively, system 200 may be implemented on a computer system and/or device.

System 200 includes a visual representation module 202 and a graphical user interface module 204. The term "module" is used herein to refer to something that may be implemented in hardware, software, firmware and/or some combination thereof. For example, module 202 may be implemented by assembly code executed by a processor; additionally or alternatively, module 204 may be implemented by bytecode executed by a virtual machine.

Figure 5:
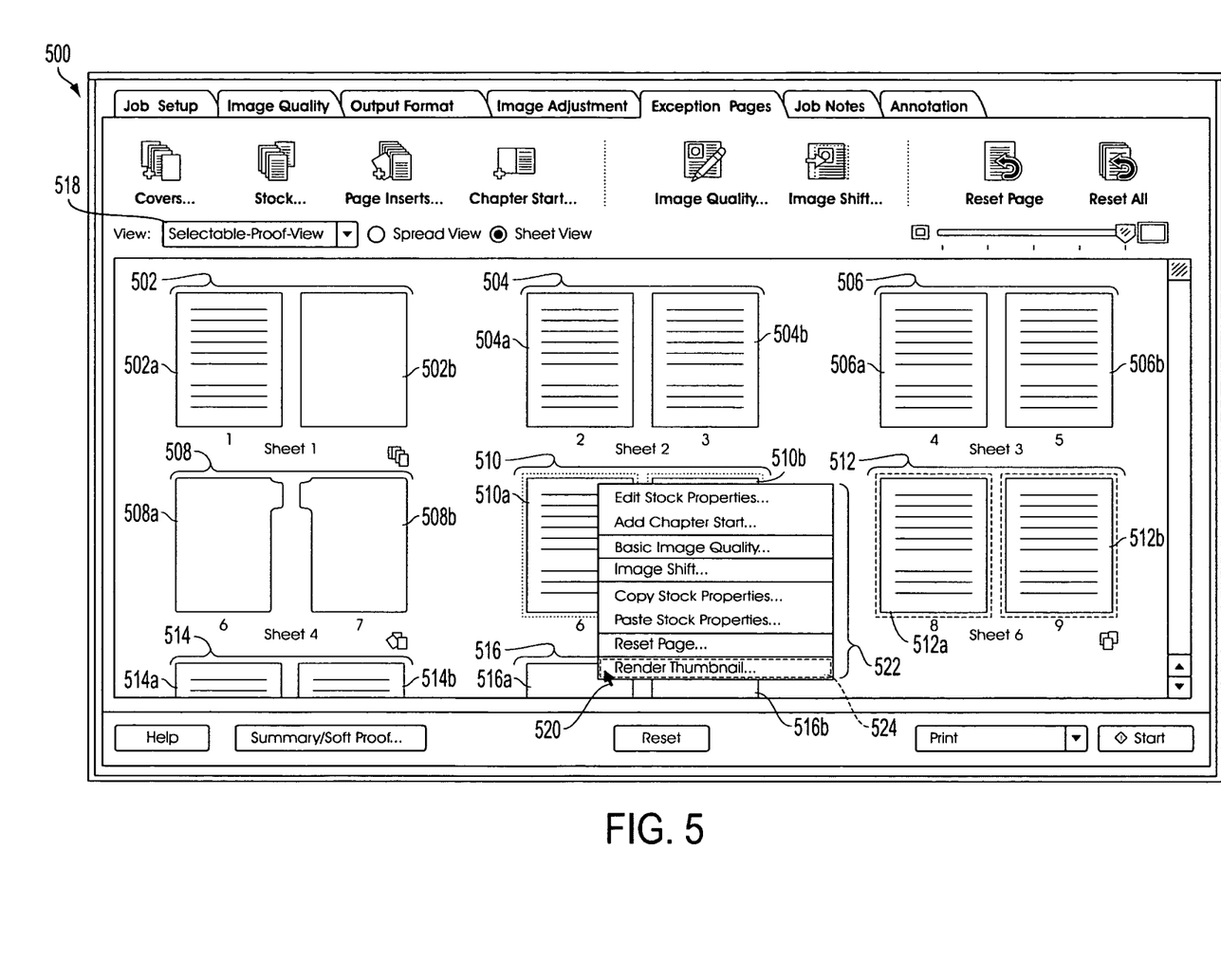
FIG. 5 is a depiction of a GUI that displays exception pages as selectable-proofs within context of a print job, the GUI forms an selectable-proof-view where the exception pages are all shown as icons in accordance with the present disclosure.
Figure 6:
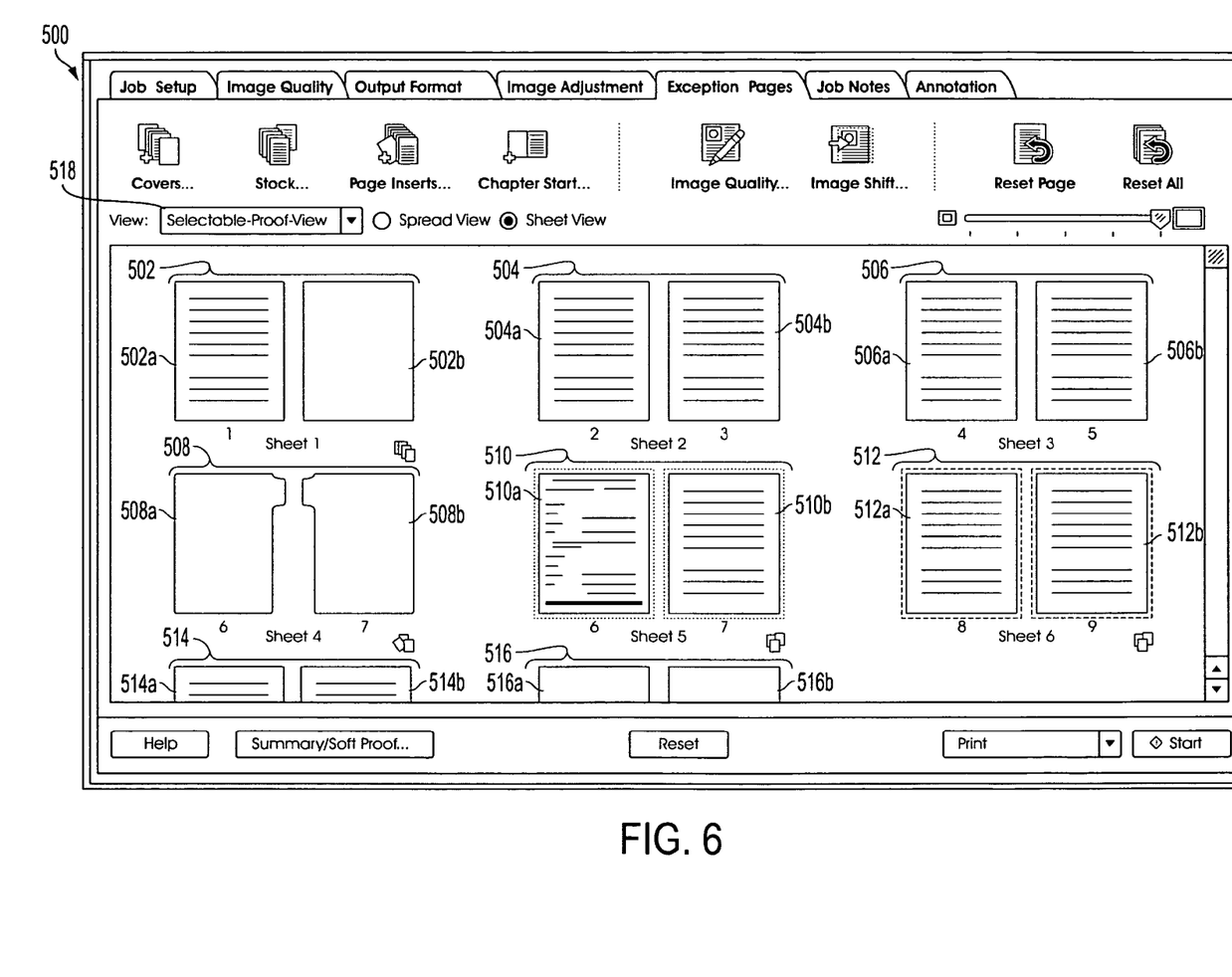
FIG. 6 is a depiction of a GUI 400, the same of FIG. 5, that displays exceptions as selectable-proofs and forms a selectable-proofs-view, where one of the exception pages is shown as a thumbnail while the remaining exception pages are shown as icons in accordance with the present disclosure.

GUI module 204 can operatively generate and operatively display a graphical user interface either directly or indirectly, partly based upon a user's selection and/or preferences. GUI module 204 includes view-selection component 232 which allows a user to select among various differing views of exception programming within context of a print job. View-selection component 232 includes list-view selection 234, selectable-proof-view selection 236, thumbnail-view selection 238 and icon-view selection 240 which corresponds to FIGS. 7, 5, 4, and 3, respectively. The selectable-proof-view selection 236, unlike the other selections, is a selection that the user can make at the page/sheet level, primarily in the icon-view selection 240, to selectively render the selected pages or sheets. The selectable-proof-view selection 236 is not a selection made at the "top level" like the other selections. FIG. 6 also corresponds to selectable-proof-view selection 236, but FIGS. 5 and 6 are described in more detail infra.

Functionality ;carried out by GUI module 204 may be done directly and/or indirectly. For example, GUI module 204 may not include all of the necessary code to display and/or generate a GUI, but rather, may utilize operating system features to perform much of the functionality. For example, many modern operating systems utilize "system calls". A system call is usually the mechanism used by an application program to request service from the operating system, or more specifically, the operating system kernel. Thus, GUI module 204 may place a system call to an operating system to create and display a GUI, e.g. consider the following pseudocode: system_call_1=new GUI("size=4,5","color=blue") and system_call_2=display GUI. The first system call instructs the operating system to operatively generate a GUI while the second system call instructs the operating system to operatively display the GUI. Additionally or alternatively, the generation and display of a GUI may occur as a result of a single system call and/or a single operation. Generating a GUI can include setting up and/or configuring several aspects of a GUI, such as the ordering of graphics, configuring features, menus, selections and/or other related aspects. GUI module 204 may be user selectable so that a user may switch between a sheet view and a spread view.

Referring again to only FIG. 2, PDL files 206, 208 and 210 are shown and may be in a data store, such as a hard drive or may be loaded into working memory, such as in Random Access Memory ("RAM"). Although only PDL file 210 is depicted as being utilized in system 200, it is within the present disclosure for system 200 to utilize multiple PDL files, such as PDL files 206, 208 and 210. For example, a print job may include multiple PDL files for setting up a print job. Additionally or alternatively, an exception page programming tool that is employed in connection with system 200 may apply exceptions to a print job that includes multiple PDL files that can create exceptions and/or exception pages throughout multiple PDL files.

Visual representation module 202 can generate a visual representation such as visual representation of a page in a PDL file 212, and visual representation of a programmed exception related to the PDL file 216. Visual representations 212 and 216 are depicted in aggregated form in representation 218. The block representation of "a visual representation of at least one of a page in a PDL file, and a programmed exception related to the PDL file" 218 is depicted to better simplify the block diagram representation of system 200. Representations 212 and 216 all include a current stock component (not shown) and an overlay component (not shown); although, visual representation 218 depicts current stock component 220 and overlay component 222. Neglecting to include a current stock component and an overlay component within visual representations 212 and 216 is only to simplify FIG. 2; and the two components are considered to be included within visual representations 212 and 216 and their inclusions are considered consistent with the subject matter disclosed herein.

Visual representation of a page in a PDL file 212 may be a representation of page found in a PDL file that has none or at least one exception applied to the page. For example, if a page exception had been applied to the page that visual representation 212 was visually representing, the representation may include the exception to the extent the exception modifies the printing look, printing layout or otherwise any other property of the page that visually alters the page when printed and/or viewed.

Visual representation of a programmed exception related to the PDL file 216 may be a visual representation that is represented by something such as a page insert, a tabbed page, stapling instructions, and/or is otherwise an exception that is not easily visually represented as a page or sheet.

Visual representation 218 includes a current stock component 220 and an overlay component 222. Current stock component 220 may include properties related to the physical medium (or substrate) that a particular page will be printing on. For example, visual representation 218 may be configured to depict a black square on a piece of paper. If the square was on a blue piece of paper, current stock component 220 would indicate the blue paper by stock color 224. The associated background color of visual representation 218 when operatively generated and operatively displayed by GUI module 204 would be blue. As a consequence, overlay component 222 may not need to be modified to account for the blue paper that creates a blue background.

Current stock component 220 thus has properties that correspond to physical properties of a stock. Current stock component 220 includes stock type 226, stock color 224, stock size 228, and stock orientation 230. These properties may be implemented as a data structure, e.g. stock type 226 may be a data structure that corresponds to a physical stock type. Consider the following example: stock type 226 may indicate that the stock to be used when printing a page corresponding to visual representation 218 is photopaper. Thus, visual representation 218 may be visually represented in a GUI as being glossy. Stock types may in include, paper, photopaper, transparencies or other printable medium. Also, stock type 226 may place constraints on the other properties of current stock component 220. For example, assume that stock type 226 indicates that A4 paper is to be printed on when a particular page is to be printed. A4 paper has physical dimensions that are defined by what is commonly regarded as A4 paper; thus, stock type 226 may limit the possible properties that stock size 228 can indicate. Constraints may be imposed by any one of stock type 226, stock color 224, stock size 228, and stock orientation 230.

Stock size 226, stock color 224, stock size 228, and stock orientation 230 indicate type, color, size, and orientation, respectively, of the stock to be used with regard to visual representation 218. In cases where a property does not apply to visual representation 218, the property may indicate that it does not apply, e.g. property=null.

Visual representation 218 also includes overlay component 222. Usually, overlay component 222 provides additional graphics and/or images that are to be displayed on top of current stock component 220. As in the example mentioned infra, consider a square that is to be printed on a sheet that is visually represented by visual representation 218. The current stock component 220 can indicate that a certain size, type, color and orientation of stock are to be used. Overlay component 222 may include the graphic display of the square which is to be superimposed over the area of a sheet, while current stock component 220 may indicate that a small sheet should be shown in a GUI as a rectangle shaped blue graphic. The square is overlaid over the stock graphic.

Figure 3:
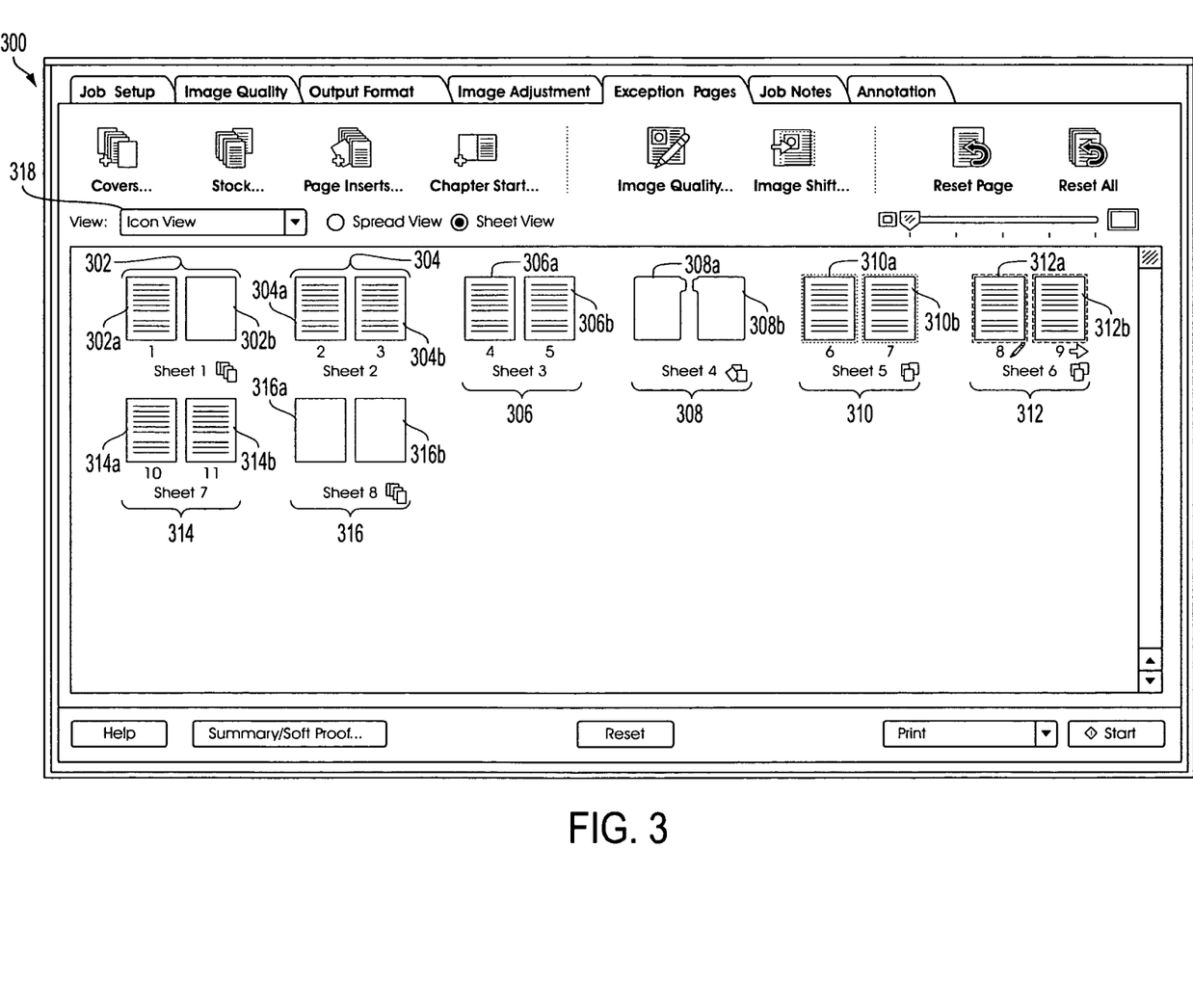
FIG. 3 is a depiction of a GUI that displays exception pages as proofs within context of a print job, the GUI forms an icon-view, the proofs are displayed as icons in accordance with the present disclosure.

For quick reference showing the relationship between visual representations 212 through 218 and a GUI, refer simultaneously to FIGS. 2 and 3; and consider the example where a user selects icon-view selection 240. The GUI module 204 may generate a GUI 300 as shown in FIG. 3 in response to a user's selection. Sheet icon 302 and page icon 302$_a$ are depicted. Sheet icon 302 and page icon 302$_a$ are shown in GUI 300 (FIG. 3) and may correspond to visual representation of a page in a PDL file 212. Additionally or alternatively, sheet icon 302 and page icon 302$_a$ may be visual representation 212. Note that sheet icon 302 may be composed of page icons 302a and 302b, additionally or alternatively, sheet icon 302 may contain page icons 302a and 302b Referring again to FIG. 2, overlay component 222 includes icon-image selection and thumbnail image selection 244. And, as mentioned supra, view-selection component 232 includes list-view selection 234, selectable-proof-view selection 236, icon-view selection 240, and thumbnail-view selection 238. Overlay component 222 displays an image based upon whether or not icon-image selection 242 or thumbnail-image selection 244 is selected.

A user can make a view selection by selecting one of selections 234, 236, 238 and 240. In cases where a user selects list-view selection 234 and selectable-proof view-selection 236, a user may be free to choose between icon-image selection 242 and thumbnail-image selection 244 of overlay component 222. In the case where a user selects thumbnail-view selection 238, system 200 may be configured so that the overlay component 222 is constrained to thumbnail-view selection 244. Additionally or alternatively, in the case where a user selects icon-view selection 240, system 200 may be configured so that the overlay component is constrained to icon-image selection 242. Thus, when icon-image selection 242 is selected, icon-image selection 242 may be automatically selected; and when thumbnail-image selection 244 is selected thumbnail-image selection 244 may be automatically selected.

Icon-image selection 242 can be a generic icon 246, gif 248, JPEG 250, user-configurable image 252, file type icon 254, operating system file-type icon 256, blank sheet image 258 and/or blank page image 260. Generic icon 246 can be an icon that is independent of image file type, e.g. the GUI can utilize a multitude of file types. Gif 248 is an icon that uses the file type of Graphics Interchange Format (gif); and JPEG 250 utilizes the Joint Photographic Experts Group's standard. User-configurable image 252 is an image that may be configured by a user. For example, a user with poor vision may want a GUI to have high contrast images for icons or use large icons. Additionally or alternatively, by utilize user-configurable image 252 a user can utilize custom made icons.

File type icon 254 may display icons based upon the file type. For example, system 200 may display pages (and/or sheets) as one icon while using one PDL file type, and another icon when displaying pages (and/or sheets) when using another PDL language file type. Also, particular PDL languages may accommodate insertions of pages of another file type, e.g. a PDL language may accommodate embedded pages forming a "compound document". Also, overlay component 222 may utilize default icons such as blank sheet image 258 and/or blank page image 260 for use when the associated page or sheet has no data or data indicating a lack printing instruction in the PDL file associated with corresponding page and/or sheet.

Additionally or alternatively, system 200 may defer to an operating system icon when displaying overlay component 222 when icon-image selection 242 is selected. Operating system file-type icon 256 may query the operating system, most likely by utilizing a system call, for an icon to display based upon the file type of the PDL file.

As mentioned supra, overlay component 222 may display a thumbnail when thumbnail image selection 244 is selected. Thumbnail image selection 244 is user selectable when list-view selection 234 or selectable-proof-view selection 236 is selected by a user. Additionally, thumbnail-view selection 238 may cause thumbnail image selection 244 to be automatically selected. Also, as mentioned supra, overlay component 222 may be an image that is "overlaid" over the image and/or representation created by current stock component 220.

When thumbnail-image selection 244 is selected, overlay component displays a "thumbnail". The thumbnail may be WYSIWYG-image 262, partially rendered image 264, blank page image 266 and/or blank sheet image 268. Also, graphics engine 270 may be used in conjunction with thumbnail image selection 244 is selected.

WYSIWG-image may be a small graphic and/or image of a page and/or sheet related to PDL file 210. Consider the following example: PDL file only has a page 1 that is to be printing on side 1 of sheet 1. The page may include a photo and some text. Graphics engine 270 may read the data associated with that page by interpreting the PDL data, and render WYSIWYG-image 262. WYSIWYG-image 262 (What You See Is What You Get image) may be simply a small image of how the PDL page would approximately appear when printed. Additionally or alternatively, WYSIWYG-image 262 may visually approximate the PDL page when viewed with a PDL editor and/or viewer. WYSIWYG-image 262 may be an approximate or exact representation of the PDL page; an exact representation is difficult because of differences in monitors, color gamuts used, variation between stocks, and/or other difficulties in exactly representing on a monitor something to be printed. Also, a WYSIWYG-image may be "downsampled" and/or compressed by a lossy compression algorithm from the PDL page to efficiently and effectively utilize displaying, computing and printing resources.

Graphics engine 270 may render and/or interpret one visual representation of representations 121 through 218, before, during, or after thumbnail-image selection 244 is selected, regardless of which one of images 262 through 268 are utilized. Preferably, the most efficient and/or effective "rendering" and/or "interpreting" ordering may be used by graphics engine 270.

Partially rendered image 264 may be an image rendered and/or interpreted by graphics engine 270 by skipping or omitting certain aspect of PDL file 210. For example, PDL file 210 may contain data related to a large JPEG that is "embedded" into a particular page. If, for example, the embedded JEPG was to be printed on a very small portion of a sheet and/or contained too much detail to be visually perceptible in a thumbnail image, graphics engine 270 may, for efficiency, skip rendering and/or interpreting the JPEG and rather may display something in its place, e.g., a small black area or outline of the area the JPEG may occupy.

Blank page image 266 may be used when there is an indication that visual representation 218, visually represents a blank page; and blank sheet image 268 may be used when there is an indication that visual representation 218 is a blank sheet. The indication may be from a "tag", lack of data, estimation of images and/or estimation of data of PDL File 210 data that corresponds to visual representation 218. Images 266 and 268 may be an image file, e.g., a JPEG, gif, or alternatively other mechanism of visually representing a blank image and/or sheet, respectively. Alternatively, if graphics engine 270 determines that a page and/or sheet corresponding to a PDL file are blank, the graphics engine may signal the overlay component (alternatively, GUI module 204, representation 218 or other component of system 200) to display nothing; thus overlay component 222 may not be visually shown and a user will only see the items of current stock component 220.

Referring simultaneously to FIGS. 2 and 3, FIG. 3 is a depiction of a GUI that displays exception pages as proofs within context of a print job, the GUI forms an icon-view and the proofs are displayed as icons. Sheet icons 302 through 316 are shown in GUI 300. Each sheet has two corresponding "page icons", referred to by the subscripts "a" and "b", e.g., sheet icon 302 corresponds to page icons $302_a$ and $302_b$.

Sheet icons 302 through 316 are shown as "proofs" and form a "proofs view". Notice that sheets 302 through 316 and/or the respective pages are arranged in an approximate grid like fashion, approximately appearing as if all of the printed pages were laid out before a person; this forms the "proofs view", and the sheets 302 through 316 and/or the respective pages are considered "proofs". Because users tend work more efficiently with spatial information, the "proofs view" gives a user an efficient and convenient way to visualize "exceptions" and pages within context of a print job. And, in GUI 300, the proofs are viewed as icons forming an "icon-view".

Page icon $302_a$ may be generic icon 246, gif 248, JPEG 250, user-configurable image 252, file type icon 254 and/or operating system file-type icon 256. Page icon $302_b$ may be blank page image 260. Also, note that page icon $302_b$ and page icon $308_a$ appear differently. Page icon $308_a$ may correspond to a slightly different current-stock component 220 than the current stock component 220 of page icon $302_b$; although both may have the same overlay component 222. A current stock component 220 that corresponds to page icon 308a correspond to a stock type of "tabbed paper" as is represented by the slight bump shown by page icon $308_a$.

Although FIG. 2 only shows visual representations 212 through 218, each of page icons $302_a$ through $316_a$ and $302_b$ through $316_b$ may have a visual representation associated with each respective icon may be described by visual representation 218. Thus, there may be a visual representation 218 associated with each of sheet icons 302 through 316 and/or each of page icons 302a through $316_a$ and page icons 302b through $316_b$.

Note that certain icons all appear to have identical page content representation, such as may page icons 302a, 304a, 304b, 306a, 306b, 310a, 310b, 312a, 312b, 314a and 314b all appear to have a identical words on the icon although each page of PDL file 210 may appear completely different when the print job is actually printed. The small writing is actually only an indication that there are things to be printed with the associated pages and/or sheets. Hence, there is minimal visual information to provide an approximate visual representation of a print job when actually printed. Utilizing icons in GUI 300 may limit the overhead that is incurred by graphics engine 270 interpreting and/or rendering a page and/or sheet.

Also, any exception that may exists in PDL file 210 is visually accounted for in GUI 300. For example, if sheet icon 308 was a sheet insertion exception, GUI 300 may show the exception with the other pages that have no exception programming applied to them. GUI 300 thus shows exception page programming within context of the print job.

GUI 300 also has a drop-down menu 318. Menu 318 may correspond to view-selection component 232, and the words "icon view" of menu 318 may visually indicate that icon-view selection 240 is currently selected. A user may use a mouse pointer to select menu 318 to change the selection of view-selection component 232 to selectable-proof-view selection 236, list-view selection 234, icon-view selection 240 and/or thumbnail-view selection 238.

Figure 4:
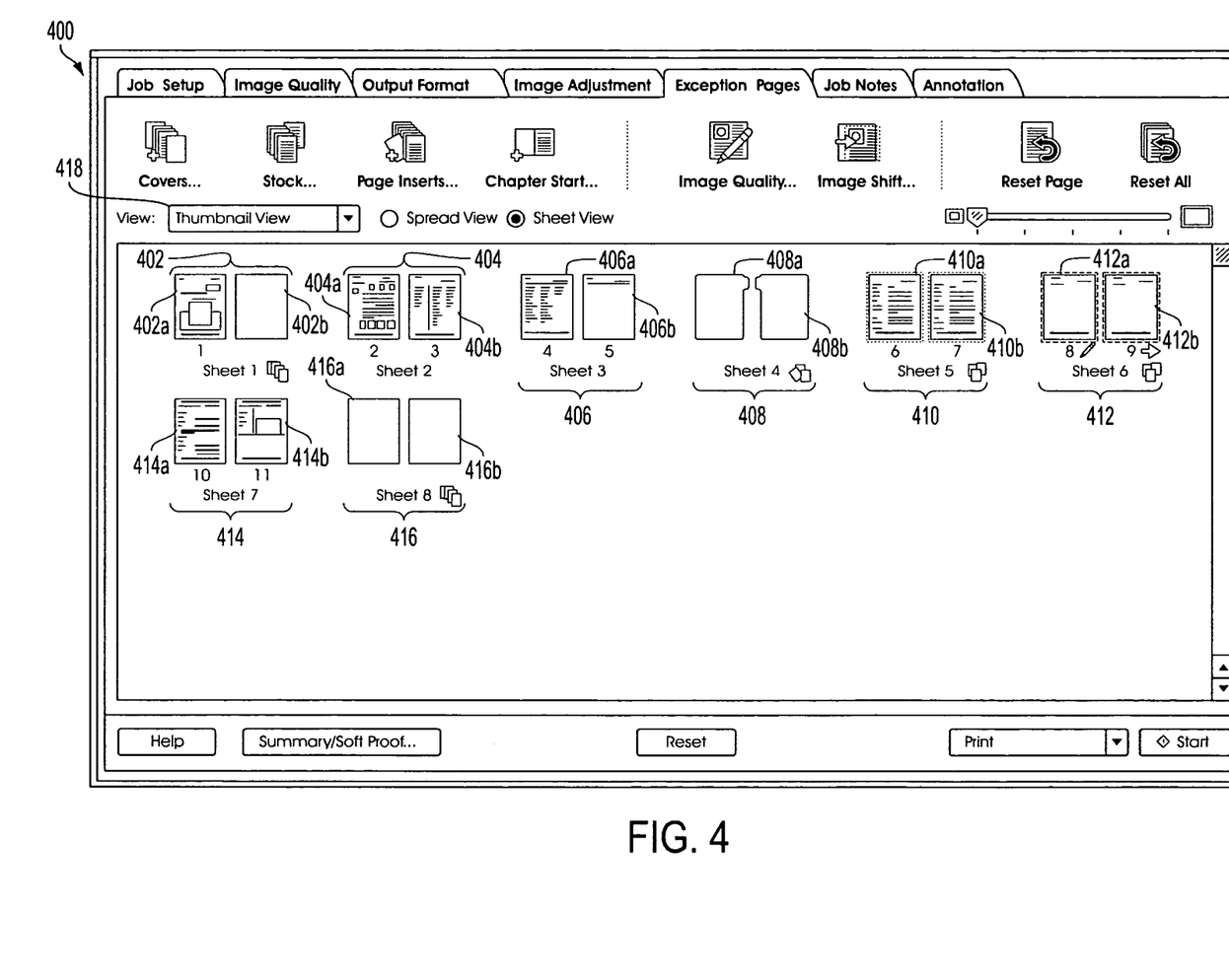
FIG. 4 is a depiction of a GUI that displays exception pages as proofs within context of a print job, the GUI forms a thumbnail view, the proofs are displayed as thumbnails in accordance with the present disclosure.

For example, a user may select menu 318, and a drop-down menu may give the user a selection of "thumbnail-view", if "thumbnail-view" is selected, GUI 300 may transform into GUI 400 of FIG. 4.

Turn simultaneously to FIGS. 2 and 4. FIG. 4 depicts a GUI 400 that may be operatively generated and operatively displayed by GUI module 204. GUI 400 includes sheet thumbnails 402 through 416 and each respective sheet thumbnail has two page thumbnails associated with it, e.g. sheet thumbnail 402 has page thumbnails $402_a$ and $402_b$. GUI 400 provides a proofs view where each proof is a thumbnail (described supra). If a user selects thumbnail-view selection 238, the overlay component 222 of each respective page and/or sheet thumbnail may have the thumbnail-image selection 244 automatically selected for each respective page and/or sheet.

Overlay component 222 may provide a "sneak" peak of a page and/or sheet in PDL file 210. The thumbnail image may be images 262 through 268 and may be an interpretation and/or rendition of a page and/or sheet associated with PDL file 210 and may be interpreted and/or rendered by graphics engine 270. Refer to page thumbnail $402_a$ and notice that it visually appears to be a miniature view of an actual page as may approximately appear when printed by a printer. Also, each of thumbnail pages $402_a$ through $416_a$ and $402_b$ through $416_b$ appear approximately how each page will appear when printed, including the exceptions applied to them. For example, page $412_b$ may have had a "page shift" exception and a stock exception (color paper) applied to it. A "page shift" exception is when the entire printable information that is to be printed on a substrate is shifted in one direction or another. This may be because a particular binder (sometimes referred to as the backing) that the printed page will be inserted in may otherwise obscure the printed page. The page shift exception may be visually depicted by the small arrow pointing to the right and/or the entire thumbnail image of the respective overlay component 222 may account visually for the shift. The stock exception is visually depicted by the colored or dark shading of pages $412_a$ and $412_b$. Also note that as in FIG. 3, FIG. 4 has a tabbed sheet for current stock component 222 of sheet thumbnail 408. Also, each of respective sheet thumbnail 402 through 416 and page thumbnails $402_a$ through $416_a$ and $402_b$ through $416_b$ may one or more of images 262 through 268. GUI 400 also has drop-down menu 418, which may be similar or identical to drop-down menu 318 of FIG. 3.

Now refer simultaneously to FIGS. 2, 5 and 6. FIGS. 5 and 6 show the following: FIG. 5 shows the icon view that the user has enlarged using the scale slider just above 506. The user has performed a "right mouse select" on page 6 (510a) which brings up the menu 522. The user then selected the "Render Thumbnail" option 524 in the menu 522. This is equivalent to the selectable-proof view selection 236 of view selection component 232. FIG. 6 shows the result of this action, i.e., the icon view with page 6 now rendered as a thumbnail.

FIGS. 5 and 6 show the same GUI 500 that displays a selectable-proof-view. GUI 500 may be operatively generated and operatively displayed by GUI Module 204 of system 200. GUI 500 shows sheet selectable-proofs 502 through 516, although some are partially obscured. GUI 500 also shows page selectable proofs $502_a$ through $516_a$ and $502_b$ through $516_b$. GUI 500 also has drop-down menu 518 that may allow a user to select one of selections 234, 238, or 240 of view-selection component 232. Each of sheet selectable-proofs 502 through 516 has a corresponding visual representation 218 where the overlay-component 222 may allow a user to select among icon-image selection 242 and/or thumbnail-image selection 244.

For example, consider GUI 500 as depicted in FIG. 6 shows all respective sheets and/or pages of PDL file 210 as being icons, thus each respective page and/or sheet may have overlay component 222 that has icon-image selection 242 selected. A user may, use mouse pointer 520 to select page selectable proof 510*a*, which may result in menu 522 displaying. Menu 522 may be operatively generated and operatively displayed by GUI module 204. A user may then select render thumbnail option 524 of menu 522, thus directly and/or indirectly causing thumbnail image selection 244 to be selected of the visual representation 218 that is associated with page selectable-proof 510*a*. Graphics Engine 270 may render and/or interpret the page of PDL file 210 associated with page selectable proof 510*a*, and may interpret/render WYSIWG image 262. The result is that GUI 500 appears as in FIG. 6 where page selectable-proof 510*a* appears as a thumbnail. Each of sheet selectable-proofs 502 through 516 and page selectable proofs 502*a* through 516*a* and 502*b* through 516*b* may have their respective overlay component 222 user selectable between thumbnail-image selection 244 and/or icon-image selection 242.

The advantage of GUI 500 is that only pages and/or sheets that a user desired to be rendered and/or interpreted are so rendered and/or interpreted, which more efficiently utilizes the resources available.

Refer now simultaneously to FIGS. 2 and 7. FIG. 7 shows a GUI 700 that displays a list-view. GUI 700 displays columns 704 through 710, and rows 712 through 742. Visual representations 712*a* through 742*a* are shown; and are displayed within rows 712 through 742, respectively. In one embodiment, visual representations 712*a* through 742*a* may automatically have icon-image selection 242 selected of overlay component 244. In another embodiment, visual representations 712*a* through 742*a* may automatically have thumbnail-image selection 244 selected of overlay component 244. In yet another embodiment, a user may have the option to select between icon-image selection 242 and/or thumbnail-image selection 244, a similar way as the "selectable-proof view" described supra.

GUI 700 displays visual representations with the exceptions displayed in context of the respective print job. Notice that in column 708, row 724 the words "page insert" are shown, which indicate that a page insert exception has been applied at that respective location to the corresponding PDL file 210.

Figure 8:
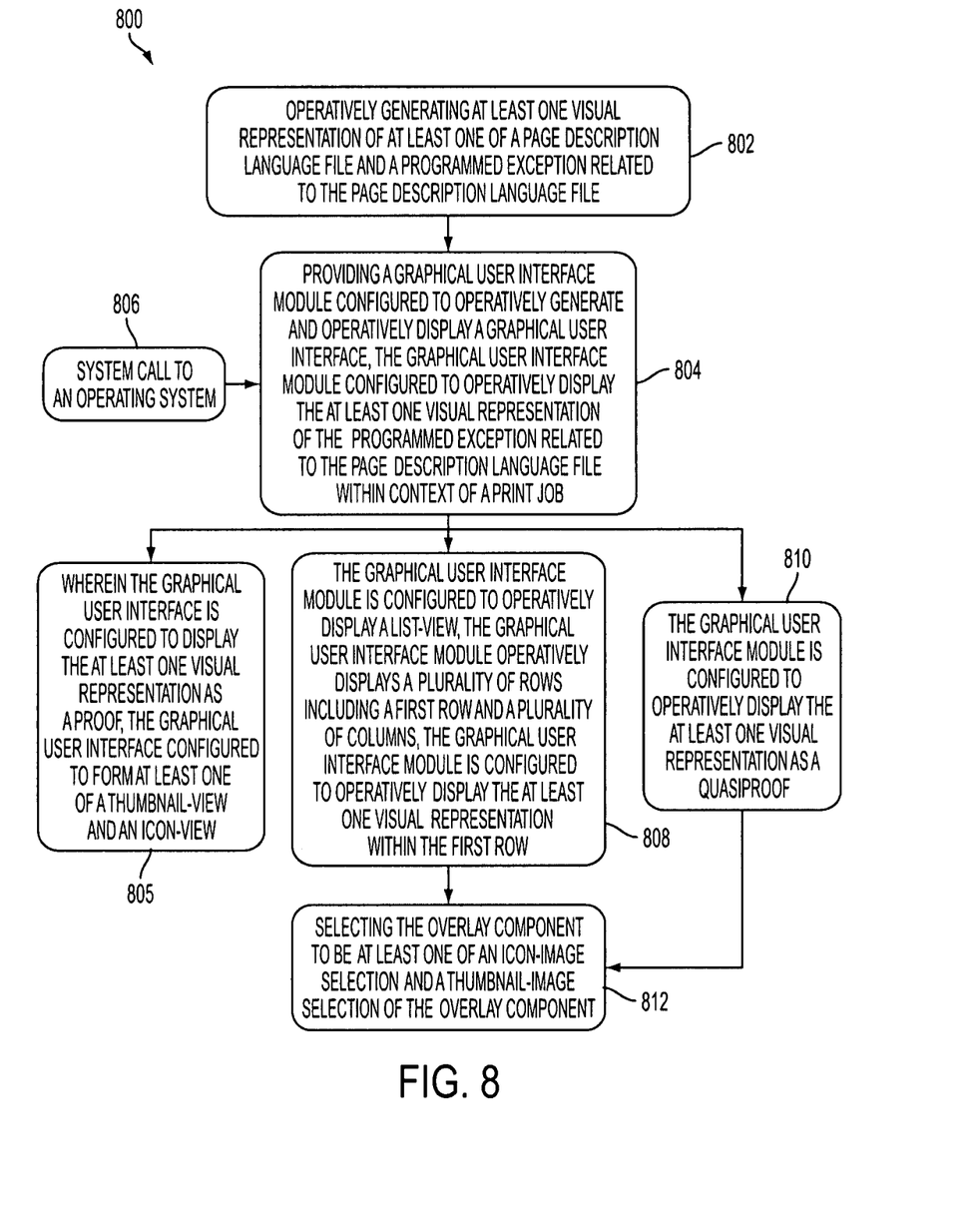
FIG. 8 illustrates a methodology employed in connection with an exception page programming tool that provides a GUI module that can operatively generate and operatively display a GUI, the methodology can operatively display exception pages in context of a print job in accordance with the present disclosure.

Referring now to primarily FIG. 8 and the other figures, a methodology 800 is shown that is used in connection with an exception page programming tool that may provide a GUI module FIG. 8 illustrates a methodology 800 employed in connection with an exception page programming tool that provides a GUI module that can operatively generate and operatively display a GUI, the methodology can operatively display exception pages in context of a print job in accordance with the present disclosure. Step 802 may be included and is operatively generating at least one visual representation of at least one of a page in a page description language file, and a programmed exception related to the page description language file. Step 802 may be carried out by system 200 by visual representation module 202 (see FIG. 2). Step 804 may be included and is providing a graphical user interface module configured to operatively generate and operatively display a graphical user interface, the graphical user interface module may be configured to operatively display the at least one visual representation of the programmed exception related to the page description language file within context of a print job. Step 804 may provide one of the graphical user interfaces 300, 400, 500, and/or 700 as shown in FIGS. 3, 4, 5 and 6 together, and 7, respectively. Additionally or alternatively, step 804 may provide the GUI module 204 as shown in FIG. 2.

Within step 804, operatively generating and/or operatively displaying a GUI may be carried out by step 806 which is a system call to an operating system methodology 800 may include block 806 where the GUI is configured to display the at least one visual representation as a proof, the GUI may be configured to form at least one of a thumbnail-view and an icon-view. The icon-view of block 805 may be GUI 300 of FIG. 3, additionally or alternatively, the thumbnail-view of block 805 may be GUI 400 of FIG. 4.

Methodology 800 may include block 808 where the GUI module is configured to operatively display a list-view, the GUI module may operatively display a plurality of rows including a first row and a plurality of columns, the graphical user GUI module may be configured to operatively display the at least on visual representation within the first row. Block 808 may refer to GUI module 203 of FIG. 2 that operatively displays a GUI similar to GUI 700 of FIG. 7.

Methodology 800 may include blocks 808 and 810, which may provide the possibility of including step 812, which is selecting the overlay component to be at least one of an icon-image selection and a thumbnail-image selection of the overlay component. The overlay component referred to in block 812 may be overlay component 222 of FIG. 2. Additionally or alternatively, the icon-images selection and/or thumbnail-image selection of step 812 may be icon-image selection 242 and/or thumbnail-image selection 244 of FIG. 2, respectively.

It will be appreciated that variations of the above-disclosed and other features and functions, or alternatives thereof, may be desirably combined into many other different systems, methods and/or applications. Also that various presently unforeseen or unanticipated alternatives, modifications, variations or improvements therein may be subsequently made by those skilled in the art which are also intended to be encompassed by the following claims.

What is claimed is:

1. A method implemented by an operative set of processor executable instructions configured to be executed by at least one processor, wherein the method provides exception page programming in connection with an exception page programming tool, the method comprising:

operatively generating at least one visual representation of at least one of a page in a page description language file, and a programmed exception related to the page description language file wherein the at least one visual representation visually depicts an exception within context of a print job, wherein the at least one visual representation comprises a current stock component corresponding to a physical property of a stock and an overlay component corresponding to a graphic or an image for display on the current stock component;

providing a graphical user interface module configured to operatively generate and operatively display a graphical user interface, the graphical user interface module configured to operatively display the at least one visual representation of the programmed exception related to the page description language file within context of a print job, wherein the graphical user interface module is further configured to operatively display the at least one visual representation as a selectable-proof, wherein the at least one visual representation includes a current stock component and an overlay component, wherein the graphical user interface module is configured to select the overlay component to be at least one of an icon-image selection and a thumbnail-image selection of the overlay component, wherein the thumbnail-image selection is configured to cause the overlay component to operatively display at least one of a WYSIWYG image, a partially rendered image, a blank page image and a blank sheet image;
selecting a subset of pages in the page description language file for rendering;
rendering the selected subset of pages without rendering any non-selected pages in the page description language file; and
displaying the selected subset of pages as rendered within the graphical user interface, wherein the graphical user interface module is configured to operatively display a list-view, the graphical user interface module operatively displays a plurality of rows including a first row and a plurality of columns, the graphical user interface module is configured to operatively display the at least one visual representation within the first row.

2. The method according to claim 1, wherein at least one of the steps of the operatively displaying the at least one visual representation and the operatively displaying a graphical user interface is implemented by utilizing a system call to an operating system.

3. The method according to claim 1, wherein the graphical user interface module is configured to operatively display the at least one visual representation as a proof, the graphical user interface module configured to operatively display at least one of a thumbnail-view and an icon-view.

4. A method implemented by an operative set of processor executable instructions configured to be executed by at least one processor, wherein the method provides exception page programming in connection with an exception page programming tool, the method comprising:
operatively generating at least one visual representation of at least one of a page in a page description language file, and a programmed exception related to the page description language file wherein the at least one visual representation visually depicts an exception within context of a print job, wherein the at least one visual representation comprises a current stock component corresponding to a physical property of a stock and an overlay component corresponding to a graphic or an image for display on the current stock component;
providing a graphical user interface module configured to operatively generate and operatively display a graphical user interface, the graphical user interface module configured to operatively display the at least one visual representation of the programmed exception related to the page description language file within context of a print job, wherein the graphical user interface module is further configured to operatively display the at least one visual representation as a selectable-proof, wherein the at least one visual representation includes a current stock component and an overlay component, wherein the graphical user interface module is configured to select the overlay component to be at least one of an icon-image selection and a thumbnail-image selection of the overlay component, wherein the thumbnail-image selection is configured to cause the overlay component to operatively display at least one of a WYSIWYG image, a partially rendered image, a blank page image and a blank sheet image;
selecting a subset of pages in the page description language file for rendering;
rendering the selected subset of pages without rendering any non-selected pages in the page description language file;
displaying the selected subset of pages as rendered within the graphical user interface;
wherein the graphical user interface module is configured to operatively display a list-view, the graphical user interface module operatively displays a plurality of rows including a first row and a plurality of columns, the graphical user interface module is configured to operatively display the at least one visual representation within the first row, wherein the at least one visual representation includes a current stock component and an overlay component, wherein the method further comprises selecting the overlay component to be at least one of an icon-image selection and a thumbnail-image selection of the overlay component.

5. The method according to claim 4, wherein at least one of the steps of the operatively displaying the at least one visual representation and the operatively displaying a graphical user interface is implemented by utilizing a system call to an operating system.

6. The method according to claim 4, wherein the graphical user interface module is configured to operatively display the at least one visual representation as a proof, the graphical user interface module configured to operatively display at least one of a thumbnail-view and an icon-view.

7. A system implemented by an operative set of processor executable instructions configured to be executed by at least one processor, wherein the method provides exception page programming in connection with an exception page programming tool, said system comprising:
at least one processor; and
a computer-usable medium embodying computer program code, said computer-usable medium capable of communicating with said at least one processor, said computer program code comprising instructions executable by said at least one processor and configured for:
operatively generating at least one visual representation of at least one of a page in a page description language file, and a programmed exception related to the page description language file wherein the at least one visual representation visually depicts an exception within context of a print job, wherein the at least one visual representation comprises a current stock component corresponding to a physical property of a stock and an overlay component corresponding to a graphic or an image for display on the current stock component;
providing a graphical user interface module configured to operatively generate and operatively display a graphical user interface, the graphical user interface module configured to operatively display the at least one visual representation of the programmed exception related to the page description language file within context of a print job, wherein the graphical user interface module is further configured to operatively display the at least one visual representation as a selectable-proof, wherein the at least one visual representation includes a current stock component and an overlay component, wherein the graphical user interface module is configured to select the overlay component to be at least one of an icon-image selection and a thumbnail-image selection of the overlay component, wherein the thumbnail-image selection is configured to cause the overlay component to operatively display at least one of a WYSIWYG image, a partially rendered image, a blank page image and a blank sheet image;

selecting a subset of pages in the page description language file for rendering;

rendering the selected subset of pages without rendering any non-selected pages in the page description language file; and displaying the selected subset of pages as rendered within the graphical user interface, wherein the graphical user interface module is configured to operatively display a list-view, the graphical user interface module operatively displays a plurality of rows including a first row and a plurality of columns, the graphical user interface module is configured to operatively display the at least one visual representation within the first row.

8. The system of claim 7 wherein at least one of said operatively displaying the at least one visual representation and said operatively displaying a graphical user interface is implemented by utilizing a system call to an operating system.

9. The system of claim 7, wherein the graphical user interface module is configured to operatively display the at least one visual representation as a proof, the graphical user interface module configured to operatively display at least one of a thumbnail-view and an icon-view.

10. A non-transitory processor-readable medium storing code representing instructions to cause a process for exception page programming in connection with an exception page programming tool, said code comprising code to:

operatively generate at least one visual representation of at least one of a page in a page description language file, and a programmed exception related to the page description language file wherein the at least one visual representation visually depicts an exception within context of a print job, wherein the at least one visual representation comprises a current stock component corresponding to a physical property of a stock and an overlay component corresponding to a graphic or an image for display on the current stock component;

provide a graphical user interface module configured to operatively generate and operatively display a graphical user interface, the graphical user interface module configured to operatively display the at least one visual representation of the programmed exception related to the page description language file within context of a print job, wherein the graphical user interface module is further configured to operatively display the at least one visual representation as a selectable-proof, wherein the at least one visual representation includes a current stock component and an overlay component, wherein the graphical user interface module is configured to select the overlay component to be at least one of an icon-image selection and a thumbnail-image selection of the overlay component, wherein the thumbnail-image selection is configured to cause the overlay component to operatively display at least one of a WYSIWYG image, a partially rendered image, a blank page image and a blank sheet image;

select a subset of pages in the page description language file for rendering;

rendering the selected subset of pages without rendering any non-selected pages in the page description language file; and display the selected subset of pages as rendered within the graphical user interface, wherein the graphical user interface module is configured to operatively display a list-view, the graphical user interface module operatively displays a plurality of rows including a first row and a plurality of columns, the graphical user interface module is configured to operatively display the at least one visual representation within the first row.

11. The non-transitory processor-readable medium of claim 10, wherein at least one of the operatively displaying the at least one visual representation and the operatively displaying a graphical user interface is implemented by utilizing a system call to an operating system.

12. The non-transitory processor-readable medium of claim 10, wherein the graphical user interface module is configured to operatively display the at least one visual representation as a proof, the graphical user interface module configured to operatively display at least one of a thumbnail-view and an icon-view.

* * * * *